(12) United States Patent
O'Brien

(10) Patent No.: US 6,943,141 B2
(45) Date of Patent: Sep. 13, 2005

(54) PROCESS FOR MAKING A LIQUID EVAPORATION RETARDANT SOLUTION

(76) Inventor: Robert Neville O'Brien, 2614 Greenswood Dr., Victoria (CA), V8N 1X5

( * ) Notice: Subject to any disclaimer, the term of this patent is extended or adjusted under 35 U.S.C. 154(b) by 644 days.

(21) Appl. No.: 10/142,872

(22) Filed: May 13, 2002

(65) Prior Publication Data

US 2004/0206930 A1 Oct. 21, 2004

(51) Int. Cl.$^7$ .............................. C11D 3/44; C11D 7/50
(52) U.S. Cl. ........................................ 510/408; 510/505
(58) Field of Search ................................ 510/202, 203, 510/201, 212, 408, 505

(56) References Cited

U.S. PATENT DOCUMENTS

| | | | | | |
|---|---|---|---|---|---|
| 4,351,754 | A | * | 9/1982 | Dupre | 524/445 |
| 5,466,458 | A | * | 11/1995 | Martin et al. | 424/405 |
| 5,954,890 | A | * | 9/1999 | Smith et al. | 134/38 |
| 6,303,133 | B1 | * | 10/2001 | O'Brien | 424/409 |

* cited by examiner

*Primary Examiner*—Gregory Webb

(57) ABSTRACT

A process for manufacturing a liquid evaporation retardant product that combines isopropanol-water azeotrope with up to 5% octadecanol by weight of the total solution, and upon which improved capability to remain precipitate free in the event of colder temperatures than normal is conferred by adding n-butanol at 10% by weight of the pre-made basic product.

3 Claims, 2 Drawing Sheets

PROCESS FOR MAKING A LIQUID EVAPORATION RETARDANT SOLUTION

BACKGROUND OF THE INVENTION

Figure 1:
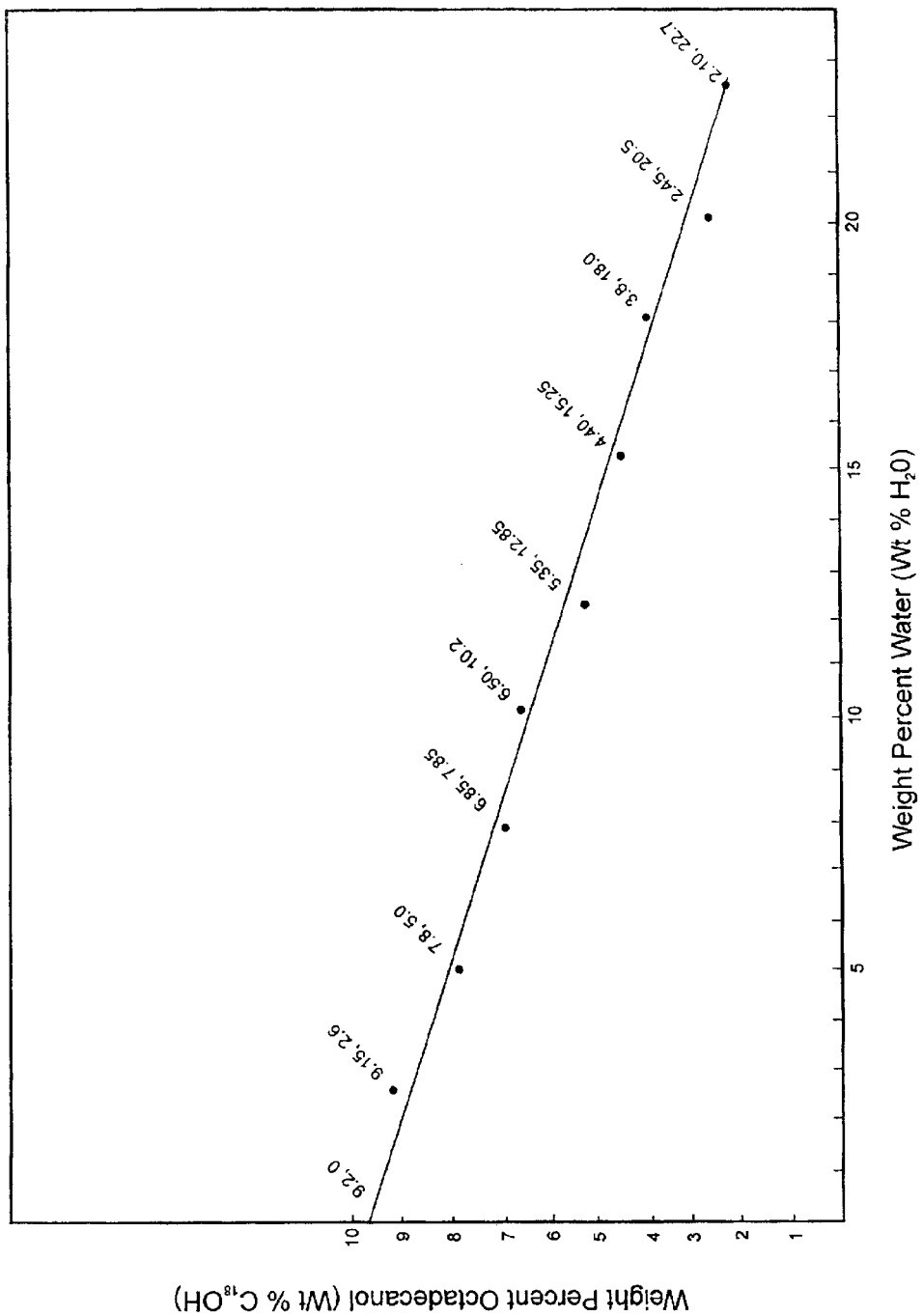

The invention relates to a process for making a liquid evaporation retardant solution that when applied to the surface of a body of water exposed to the atmosphere forms thereon a two-dimensionally extensive interfacial structure called in the art a 'monolayer', 'monomolecular film', or 'Langmuir film'.

An interested general reader may wish to consult the short informative discussion of monolayers accompanied by FIGS. 7.17, 7.18, and 7.19, in *DESIGNING THE MOLECULAR WORLD*, P. Ball (Princeton University Press, 1994).

Since early twentieth century work by I. Langmuir, E. K. Rideal, and others, monolayers research in laboratories has been advanced by occassional introductions of new techniques, for example, the laser interferometry method introduced by the present inventor, and referred to in *LIPID AND BIOPOLYMER MONO-LAYERS AT LIQUID INTERFACES*, K. S. Birdi (Plenum Press, 1989), which presents FIG. 4.32 to illustrate retardation of water evaporation from a surface by a hexadecanol and/or octadecanol monolayer. Hexadecanol and outadeoanol are non-ionic solids of substantial insolubility in water, and are straight-chain aliphatic alcohols having respectively sixteen and eighteen carbon atom molecular chains featuring a non-polar 'tail' section which is hydrophobia, and a smaller polar 'head' section which is hydrophillic.

The end position of the polar unit 'head' makes the higher aliphatic alcohols primary alcohols, as opposed to secondary. A secondary alcohol, isopropanol, for example, locates a corresponding unit centrally in its molecule. With the higher aliphatic alcohols, notwithstanding an unlikeness of their head and tail portions, the forces holding these parts together are a chemical bond of high energy and much larger than the physical association forces between the solute and the solvent alcohol, otherwise the separation that occurs in ionic compound dissolution would be evident which is not the case here.

Although hexadecanol and octadecanol are not the only compounds capable of forming monolayers that retard evaporation, they are the top two choices among those involved in practical water conservation efforts utilizing monolayers. Their reasonable cost and ready availability are assured by large-scale manufacture to supply the bar soap, cosmetics, pharmaceuticals, lubricants, and several other sectors using these commercially so-called 'heavy-cut detergent range' aliphatic alcohols in large quantities.

*RETARDATION OF EVAPORATION BY MONOLAYERS: TRANSPORT PROCESSES*, editor V. K. La Mer, (Academic Press, 1962) contains astute discussions of theoretical aspects of monolayer formation and also several reports on a wide variety of methods tried by water conservation field workers for distributing monolayer forming materials, usually hexadecanol or octadecanol or a mix of the two, onto lakes and reservoirs. An important implication of the field reports is that when the laboratory research is left behind, fieldwork in water conservation encounters numerous problems that are complex and difficult both to assess with precision and to counteract effectively. Methods of investigation of monolayers conducted in the laboratory setting, including the inventor's own laser interferometry techniques, possess little applicability where the fieldwork is concerned, unfortunately.

In other words, techniques, materials, and research methodologies developed in laboratory work are generally not directly transferrable to problem-solving directed to practical end-use application of monolayer forming materials to conserve water supplies on the large scale After laboratory research initially revealed suppression of evaporation by films only a molecular length thick, in the early days of the art, there seemed assured promise of great economies respecting quantity of monolayer forming material that would be needed to produce the interfacial structures in sizes covering even quite large lakes and reservoirs. Effective distribution of the material in environments featuring not only a large scale, but more significantly, uncontrolled conditions, proved to be a stumbling block.

A typical laboratory problem had been finding ways to apply to a water surface in a relatively small 'Langmuir trough' (shown in the Ball book by FIG. 7.17) an appropriately miniscule amount of the monolayer forming substance. Resolution of the problem involved making liquid solutions from which a solvent constituent serving as a bulking agent to render extremely small amounts of film former handleable would escape the water surface upon application of the solution thereto. A solvent much used in early work is benzene, however benzene proved to not escape the experimental region so thoroughly as intended. Another hydrocarbon solvent, hexane, proved to escape well and came into use as a spreading solvent in research work, such as that by the present inventor and others; for example, see "The effect of monolayers on the rate of evaporation of $H_2O$ and solution of $O_Z$ in $H_2O$", R. N. O'Brien et al, *Canadian Journal of Chemistry* 54, 2739, (1976), wherein hexane was the solvent.

Another solvent of known solution-making utility for adding bulk and to render distribution of a miniscule quantity of aliphatic film former maneageable in laboratory research is pure ethyl alcohol. Use of this short-chain alcohol is feasible not only in connection with distribution upon a Langmuir trough water surface, but has been used to study how a coating of aliphatic alcohol upon soil particles confers hydrophobicity, as reported by J. W. Kijne in "The action and durability of cetyl alcohol as an evaporation suppresant in soils", *Netherlands Journal of Agricultural Science* 20, 145, (1972). The ethyl alcohol solution in that research contained as the solute 1% commercial 'cetyl alcohol' which was actually a mixture of 52% n-hexadecanol, 42% n-octadecanol, and 6% n-tetradecanol. J. W. Kijne no more proposed that large acreages of dry agricultural land should be soaked with a 99% ethyl alcohol solution, than I. Langmuir would have proposed adding benzene to public water supplies, or the present inventor would have proposed adding a hexane solution thereto instead. Laboratory-useable-solutions capable of depositing a monolayer-forming solute on a substrate in a small vial, dish, or Langmuir trough should not offhandedly be presumed utilitous for fieldwork applications.

Out at a lake or reservoir the theoretical amount of monolayer forming material for a given surface area coverage is not even particularly relevant as a guideline, since it is known never to be nearly enough. Naturally occurring uncontrolled factors cause substantial film forming materials losses, which are not really predictable, and it is known that the ordinary workers without exception agree on recourse to distributing an excess of material. The initial promise of economy respecting materials utilization rate has not proved realizable. The real material requirements for quantity of solute film former will tend to be large, not small. Therefore, if solute concentration is too low, in a solution using a solvent that is much more costly than the solute, the resulting diseconomy and impracticality of making and dispensing large amounts of such a solution to conserve water should not be ignored and/or glossed over by mere technical points such as that the solvent does, after all, dissolve the solute, thereby rendering a normal solid distributable in a liquified form.

A perception that the cost of a solvent would be excessive perhaps has contributed more than anything else to an important divide between two basically different technological approaches in the practical sector of water conservation by use of monolayers, namely: the divide between handling and distributing the film forming materials either in the solid state, the state of the higher aliphatic alcohols at standard temperature, or else to produce a liquid vehicle. Those choosing solids are relieved of concern with cost of a solvent, whereas those who espouse a solution route must attend to this concern. Further evident is a divide between intermittent re-distributions of evaporation retardant as necessary, after losses have occurred, or else providing for continuous steady distribution predicated on the idea that ongoing losses should be countered by ongoing replenishment. These two divides are not such as to absolutely exclude use of solids from continuous methods or exclude use of liquids from intermittent methods, but in general the solids distribution approach is better matched to intermittent rather than continuous operations.

Liquid forms of evaporation retardant compositions, more so than solids, tend with approximately equal ease to be distributable either by intermittent or continuous methods, as conditions warrant, affording a flexible balance of capabilities for meeting practically all causes of material and film loss. Besides inferior flexibility in this connection, it is known that particulate solids are susceptible to some causes of loss that either do not affect at all, or do not as seriously affect, distributed liquid forms of evaporation retardant.

One of the La Mer book reports tells how hexadecanol in a flaky solids form—as usually shipped by primary producers such as Proctor & Gamble—was in the dry summer of 195 manually scattered by volunteering boaters directly from shipping sacks onto Crystal Lake in Illinois, under supervision provided by Illinois State Water Survey Division worker, W. J. Roberts. The plan was to conduct the flake scattering operation intermittently, as often as necessary. The Crystal Lake experience seems only to have been feasible because lakeside-residing or nearby residing volunteers who owned boats were available, and because the material was considered cheap enough that measuring just how much should be scattered could be omitted. Manual scattering by a multi-boat fleet of volunteers has the drawback that major water supply reservoirs are often sited at great distance from habitations of prospective volunteers. However, the concept of distributing aliphatic alcohol solids unmixed with any other chemicals has also been given effect both in Australia and in America using powder blowing machines rather than fingered human hands to scatter waxy solid alcohol particles. With high-speed boats, big sprays of powder pluming out therefrom, the labor content of spreading operations is reduced.

Machine-blown plumes of solid particles tend to lose more particles carried aloft by adverse wind and transported to where they are not needed, namely ashore. The machines are more susceptible to clogging—by far—than are human fingers.

Two causes of material loss for solids distribution methods that do not affect liquid forms are ingestion of flakes and particles by minnows, and heavy microbial growths colonizing any particles missed by the minnows. An all-solids distribution approach can lose much of its advantage respecting cheapness if significant material quantities are wasted even before an evaporation retarding film can be established. Liquid forms permit film formation substantially without pre-film distribution lose.

Unfortunately, both basic distributionx of either an all-solids or a liquid form composition will face problems and causes of more losses after the monomolecular film of aliphatic alcohol is formed. Such a structure is a fragile entity which is not expected to long endure in natural outdoor settings. By chance there may occassionally occur favorable environmental conditions which extend film life. Tear and puncture resistance of a one molecule length thick film require highly sophisticated techniques to even measure, the magnitude is so low, and a film is susceptible to serious damage or outright disintegration by such simple uncontrolled events as hail, rain, choppy water, or even just flocks of birds alighting upon and afterwards taking off from a monolayer-covered lake or reservoir. As a response specifically to such transient and uncontrollable causes of film loss, there is merit to intermittent methods of film former distribution involving cessation of operations during periods when any film formed would tend to be destroyed as fast as formed.

Wind has not only the above mentioned airborne transportation effect on cast-through-the-air solids, but has a well known effect of propelling an already formed film itself along the water surface until it collapses onto a leeward shoreline. This is called 'rafting' in the art, and the collapse is called 'retraction'. Steady even moderately low-velooity wind with a prevailing direction, which is not uncommon at reservoir sites, causes rafting leading to retraction about which nothing can practicably be done except to continuously distribute an excess of film forming material from the windward side. Here it can be easily seen that materials costs go up substantially. Liquid solutions are no more immune to the film destruction problem than any other form of evaporation retardant composition, making it imperative to keep the starting materials costs for solution making as low as possible.

Several if not all possible causes of film lose may be operative at one time, but the deadlier two film destroyers are the chop-caused outright disintegration and collapse onto the lee shore due to wind-propelled rafting. Additional and relatively minor losses of already formed film material are caused by photochemical degradation, oxidation, evaporation (not of underlying liquid but of the alcohol film), and even dissolution or blending into an underlying liquid body which is far from being the relatively pure water of laboratories. Suspended oily dirt and other particles may be present in a lake or in a reservoir downstream of an agricultural or industrial district. The hydrophobic tails of aliphatic alcohols are not lyophobic. To the contrary, they are oil-loving and if given an opportunity will attach to oily dirt particles riding in the water, instead of sticking up from the water surface. If heavy-cut detergent range aliphatic alcohols did not have this attraction of their molecular tails to oily dirt, they would be useless in many of the applications which provide the commercial incentive for their mass-production. The point here is that if encountering dirty water happens to be yet another loss-causing condition beyond the control of the water conservation worker, again about all he or she can be expected to do is apply an excess of the evaporation retardant composition.

One final film loss circumstance warranting mention is that reservoirs of the type having overflow spillways will drop their surface-borne film right over the spillway. In a swimming pool, certain drains flush with the surface do the same thing. Obtaining enduring coverage of certain types of a body of water, the surface of which is itself not the fixed-in-place entity it superficially appears to be, but instead constantly moves on, imperceptibly replaced by an identical surface, therefore will necessitate a continuous mode of evaporation retardant distribution, even if all other loss causing factors are absent.

The background discussion to this point is thought to have established the likelihood that larger than the theoretical quantities of evaporation retardant film forming materials are required in their practical utilization outside the laboratory.

Laboratory practitioners would not orinarily concern themselves over expense of a solvent for rendering miniscule amounts of aliphatic alcohol handleable, yet it is common for information about solvents to originate from laboratory work. Whether there does or does not eventuate a contribution to the patent literature, the same information is often disclosed in research papers. Possibly when Dr. Kijne, in his research paper cited above, mentioned use of an ethyl alcohol solution with a 1% aliphatic alcohol concentration, he did not realize that a solution of the same kind and with that concentration within its specified range had a half dozen years earlier received U.S. Pat. No. 3,273,957 for a METHOD OF RETARDING SURFACE EVAPORATION (Sept. 20, 1966), N. Beredjick, inventor.

Rather than proposing it to be altogether novel to dissolve an aliphatic alcohol in an obviously feasible solvent such as ethyl alcohol, etc., N. Beredjick focussed disclosure on data established by small scale experiments directed to aiding determination of an appropriate range for the concentration of film forming solute he sought as an improvement. Improvement was needed specifically because of there having been suggestions previously of concentrations in some range that did not work. The unworkable concentration range referred to, unfortunately, was not identified in this cited patent (BEREDJICK). However, in view that a concentration between only 0.1% and 2% solute was proposed by N. Beredjick, it seems reasonable to suppose that the unworkable concentration range suggestions had gone substantially higher, rather than lower. However high they went, those suggested concentrations had to N. Beredjick's personal knowledge caused two problems: 1. they destroyed film forming properties of the aliphatic alcohol solute; and, 2. they caused undesirable solute precipitation in containers subjected to wide temperature variation.

The data presented in Tables I and II (BEREDJICK) unfortunately do not reveal anything about propensity to solute precipitation; there is no disclosure of saturation level at standard temperature, let alone at a lower temperature where solubility is expected to decrease for most known types of true solutions. In the present inventor's opinion, it is scientifically required to address the issue of saturation level whenever a need to assess probability of solute precipitation is evident. Nevertheless, some previously unavailable data was produced, and and the cited prior art patent thus merits being accorded a real contribution to the art.

Specifically referring to Table II of N. Beredjick's patent, the data interestingly shows—for one thing—how very small a difference respecting the evaporation retarding outcome was found to obtain between an n-butanol solution with a 0.1% octadecanol concentration, and an isopropanol solution at the same 0.1% concentration of the same solute. If data had been presented on stabilities for the two close-in-effectiveness solutions at standard and then cold temperatures, the patent could then have indicated which one operates best for resolving the rather neglected one pf the two background problems raised in the second to last sentence of the third paragraph of the patent: undesired solute precipitation.

Essentially, the Beredjick invention proposes making non-aqueous alcoholic evaporation retardant solutions made in the concentrations of between 0.01% to 2% aliphatic alcohol as the monolayer forming solute, and from a minimum of 98% up to a high 99.99% concentration of short-chain alcohol as the solvent, preferring hexadecanol and/or octadecanol as solutes, and ethyl alcohol or else isopropanol as the solvents. In the present inventor's opinion, although a solution in accordance with these teachings is as technically feasible as would have been expected at the time of the disclosure, for the covering of 50 ml. water in three-inch diameter dishes, the teachings fail to afford an order of materials cost economy commensurate with justifying the large-scale use of an evaporation retardant made and distributed in the form of an alcoholic liquid solution. Above discussion of materials loss problems in the field explains exactly why this is the present inventor's opinion. The technical workers at the end-use sites invariably deal with the materials loss problems by distributing excess amounts of whichever composition has been recommended and supplied to them.

The Beredjick patent expressly permits the latitude of precise quantities calculation to the field workers, which is not a policy from which specifically the present inventor means to diverge; however, the present inventor has taken well into account the workers' known practices when devising the product with which they will be armed for combatting water evaporation.

Three brief remarks concluding the background of the present invention are now in order. First, it is expected that some urgent circumstance of drought will oneday require large quantities of evaporation retardants to be transported from the place of manufacture to where needed. A considerable distance of transport by truck, in such an instance, is envisioned. If it were generally adopted to employ a liquid alcohol solvent at so high a concentration as taught by N. Beredjick, viz. up to 99.99%, such a practice is considered by the present inventor to haul too much solvent and to be not so fitting to the end-use circumstance as would be use of a substantially cheaper solution capable of delivering a greater amount per truckload of the film forming material needed, hauling as little costly liquid alcohol solvent as is feasible.

Second, in any urgent case of need for a water conservation product especially, but also at any time, it is highly desirable to optimize the speed of production, striving for fast production. Nothing at all was taught in the cited prior art concerning how fast the solute dissolved. Supposing all other factors equal, comparing two effective products, it would always be justified to adopt the more quickly manufacturable solution.

Third, the second of the two problems raised in the close prior art Beredjick patent should not be neglected. If anything is to be done about a foreseeable prospect of undesired precipitate formation, what that is, to be done, calls for being specified clearly, instead of leaving it to between-the-lines conjecture—conjecture that, for example, supposes: if there is minimal amount of solute in the first place, that by itself may ensure that precipitation problems could hardly be major.

BRIEF SUMMARY OF THE INVENTION

Technical objectives of this invention, a process for manufacture of a liquid evaporation retardant product, include:

1. specifying how to render an aqueous alcoholic solution capable of meeting practical large-scale evaporation retardant applications requirements, if it contains, on the one hand, a greater concentration of dissolved normally solid-phase higher aliphatic alcohol, and, on the other hand, a lesser concentration of short-chain normally liquid-phase alcohol, than anyone who has proposed making any similar product for retardation of evaporation has previously suggested;
2. specifying how to achieve a faster dissolution process producing the product of the invention, by comparison to processes producing generally similar products but which involve different concentrations of higher aliphatic alcohol and short-chain alcohol than in the invention;
3. teaching the making of a solution meeting the foregoing two objectives without unduly risking solute precipitate formation at normal temperature, and which is susceptible to readily being improved with respect to further mitigation of risk of precipitate formation at below normal temperatures, merely by adding one additional constituent;
4. specifying what constituent to add to a solution made in accordance with the process of the invention, whenever conditions of storage and/or transport of the solution are likely to subject it to below normal temperatures; and,
5. ensuring that the process of the invention produces a a liquid evaporation retardant product that freely discharges from a submerged container through an orifice of small diameter, down to at least 0.2 mm, without clogging the orifice or requiring high pressure to force discharge.

From commencement of the project to develop the invention to the extent of meeting the foregoing objectives, it has been kept in mind that practical fieldwork applying film forming aliphatic alcohols to relatively large bodies of water, when the source of the film former is a solution containing it, has always relied on the kind of ultimate dilution which occurs whenever an aliphatic alcohol-containing solution is added to the body of water at the end-use site. That dilution, by water of the site itself, is the instrumentality, in other words, for releasing the film forming solute from solution so that the film will be formed. The inventor believes that an evident lack of information in the prior art, respecting exactly how much water must be present in order that the film-forming solute will precipitate as intended, is explained by the fact that there is always so much more than enough water present to effect what has just been referred to as the 'ultimate dilution'. Because that dilution is the means for precipitating the film former, it is not really surprising that the prior art workers have entirely neglected to investigate the question of how much water might be permissibly mixed with the combination of a higher aliphatic alcohol and a short-chain alcohol, without exceeding the saturation level for the solute (higher aliphatic alcohol), hence without formation of a precipitate thereof.

No data being available from the prior art, there was a need to acquire data, on the basis of which—without ruining film forming properties or unduly risking solute precipitation within containers—a judiciously predetermined amount of water might intentionally be included in the solution. Such an inclusion of water is both a requirement of the invention and a point of distinction between it and the liquid alcoholic solution of N. Beredjick's patent cited above. A tentative hypothesis was entertained: that for solutions containing octadecanol as the film forming solute, and based on isopropanol as a solvent, but with water added, a decreasing function likely exists, with the water concentration as the independent variable, and octadecanol concentration as the dependent variable.

As a research chemist, the inventor never takes tentative hypotheses like this one for granted—he puts a hypothesis to the test. That the hypothesized decreasing function does in fact exist he shows by data next presented. The data may with equal sense be regarded either as solubility data or saturation level data, which careful experiment at standard conditions obtained. Results for ten test solutions tabulate as follows:

TABLE I

Octadecanol-saturated Isopropanol-based Solutions

| Solution # | Concentration* $H_2O$ | Concentration** $C_{18}OH$ |
|---|---|---|
| 1. | 0 | 9.16 |
| 2. | 2.57 | 9.17 |
| 3. | 5.06 | 7.81 |
| 4. | 7.86 | 6.84 |
| 5. | 10.19 | 6.50 |
| 6. | 12.90 | 5.32 |
| 7. | 15.27 | 4.39 |
| 8. | 18 | 3.77 |
| 9. | 20.2 | 2.44 |
| 10. | 22.85 | 2.24 |

*wt. % of blend with isopropanol
**wt. % of solution

The experiment was conducted with preparation of the test solutions in such a manner that for each one an extremely small additional amount of solute would take the solution above its saturation level, which level was readily ascertained to have been exceeded when precipitate of the solute appeared.

The test data of Table I subsequently was plotted on a graph included herewith as FIG. 1, and a linear equation for the decreasing function was derived, to be presented later. The experiment from which this set of data emerged was only the first of three experiments, each of a different nature, but all considered necessary in development of the invention. The first was oriented specifically toward the desideratum of more economical production of a liquid alcohol-containing evaporation retardant solution.

A second experiment was conducted to ascertain how the objective implicit to the second background conclusory remark should be secured, namely: optimizing the speed of production. Time is of the essence is fighting drought. Times to dissolve 10 g of octadecanol in 100 ml of isopropanol-water mixtures at a temperature above the standard condition were obtained by experiment for eight solutions, results for which tabulate as follows:

TABLE II

Rates of Octadecanol Dissolution vs. Water Content

| Solution # | Concentration $H_2O$ | Minutes to Dissolve |
|---|---|---|
| 1. | 0 wt % | 35.8 |
| 2. | 2.5 | 32.2 |
| 3. | 5.0 | 16.0 |

TABLE II-continued

Rates of Octadecanol Dissolution vs. Water Content

| Solution # | Concentration H$_2$O | Minutes to Dissolve |
|---|---|---|
| 4. | 7.5 | 11.5 |
| 5. | 12.2 | 7.2 |
| 6. | 12.5 | 7.5 |
| 7. | 15.0 | 13.1 |
| 8. | 17.5 | 19.5 |

It was considered appropriate for these trials to use a larger proportion of solute than saturation levels at standard conditions permit, because a 430° C. hot bath temperature, adopted as a semblance of common practice of hastening dissolution processes, was used. All eight Table II resulting solutions would of course tend to precipitate that portion of their solute above saturation level at standard conditions when standard conditions are reached by cooling, and it should be borne in mind that the purpose of this second experiment was not production of solution for actual use, but instead was to obtain an idea of how various concentration combinations respecting water and isopropanol tend to vary respecting time rates for dissolution of octadecanol. Actual time rates are expected to be faster in actual production set-ups for several reasons, including solute concentration at a level below saturation for standard or realistically expected conditions, warming of liquid constituents, as much agitation as desired, and, if desired, use of more finely divided than usual particles of the octadecanol.

A totally unexpected phenomenon encountered during the second experiment contributed materially to the invention and is next discussed.

With reference now to solution #5 of Table II, the water-to-isopropanol ratio is approximately that known for the isopropanol-water azeotrope. Boiled at 1 atmosphere and 80.3° C. the azeotrope's water concentration is 12.6 wt. %. Boiled at 4.06 atm. and 120.5° C., water concentration declines by 0.9% to to 11.7 wt. %. This azeotrope, in large chemical processing plants making isopropanol, is produced at least one major step ahead of the pure isopropanol, and therefore in its own right is both cheaper and faster to make than pure isopropanol. What is considered amazing as a phenomenon that emerged from the second experiment is that near the azeotrope the octadecanol dissolves faster than for other tested solvent systems either below or above the azeotrope respecting water concentration. If it were thought that a substantially lower water concentration than about 12 wt. % would provide faster dissolution, that has been disproved. Had it been thought a substantially higher water concentration would mean slower dissolution, that has has been confirmed. A further observation made as the solutions of the second experiment cooled was that some solutions showed precipitate and some did not, so a repetition run at 40 degrees Celcius and at two important concentrations of octadecanol held at 40 degrees Celcius for about three hours until all octadecanol was dissolved was performed as a corollary. The observed but important non-mathematical results are shown in Table III.

TABLE III

Anomalous precipitation of octadecanol from water-isopropanol solutions

| Percent Isopropanol | Percent Octadecanol | Precipitate | Solution Color |
|---|---|---|---|
| 100 | 6.5 | Yes | None |
|  | 10 | Yes | None |
| 97.5 | 6.5 | — | — |
|  | 10 | Yes | None |
| 95.0 | 6.5 | Yes | None |
|  | 10 | Yes | None |
| 92.5 | 6.5 | Yes | None |
|  | 10 | Yes | None |
| 90.0 | 6.5 | Yes | None |
|  | 10 | Yes | None |
| 87.5 | 6.5 | None | None |
|  | 10 | None | Cloudy |
| 85.0 | 6.5 | None | Cloudy |
|  | 10 | None | Cloudy |
| 82.5 | 6.5 | None | Cloudy |
|  | 10 | None | Cloudy |
| 80.0 | 6.5 | None | Cloudy |
|  | 10 | None | Cloudy |

These results are even more unpredictable than those of Table II. There is no theory to the knowledge of the inventor to explain why the azeotrope and super-azeotropic amounts of water in the isopropanol would better retain the octadecanol in solution, though the cloudiness may be an indication of "in statu nascendi" as postulated by E. Matijavic but which is currently not in vogue.

Again combining all these data of the inventor—nowhere else available—is that optimized speed of dissolution and hence speed of manufacture is a property of the azeotrope of isopropanol with water and also the retention of the octadecanol even above measured octadecanol solubility at room temperature.

Combing this surprising information with information from the first experiment permits confidence in the presentation below of process specification elements directed to making the desired product faster, cheaper, and with greater solute content compared to the nearest prior art (BEREDJICK), leaving, however, the one remaining issue of non-standard temperature effects to subjection to its own—a third independent experiment.

Doubting that the isopropanol-water azeotrope was a pancea solving all problems at one stroke, a plastic bag type container filled with a solution comprising the azeotrope and octadecanol dissolved at 2.5% concentration was chilled in ice-water to zero degrees Celcius to whether precipitation would form as expected.

It did. The saturation level for the solute dropped as expected with the severely lowered temperature, and a large amount of white solid-phase octadecanol precipitate formed. This third experiment, which may be called 'the icewater test', was then extended in the manner next discussed.

The inventor, over the course of a second career as a practicing chemist and chemistry professor, following a first career as a fighter pilot when lacquers and paints even then were relevant topics, has often had to deal with lacquer and paint formulations, and the use of solvents associated with lacquer and paint making. Memory not always serving perfectly, and advances made by others occurring from time to time, the inventor keeps himself 'briefed' by consulting a wide variety of information sources, including the 4th Edition *Encyclopedia of Chemical Technology* (abbrv. ECT). The liquid short-chain alcohols, as the cited prior art incidentally shows, are all of interest as possible solvent system constituents for dissolving a higher aliphatic alcohol. One of them is n-butanol which is also known for use in a mixed solvent system for lacquers.

'Synergistic' is a term which when encountered in information sources consulted elicits somewhat more than usual interest, from an inventor's standpoint. For example, where it is indicated in the ECT article on "BUTYL ALCOHOLS", under the "Uses" subheading, that n-butanol "acts synergistically" with another solvent to give a stronger solvent system than either one, for making nitrocellulose lacquers, this elicits interest, even though nitrocellulose is rather different from octadecanol, and the other solvent, butyl acetate, is rather different from isopropanol. Here is a case where an inventor's hunch can go beyond the realm of ordinary technological skills and practices. The present inventor had, oneday, and then promptly acted upon, a hunch that n-butanol and isopropanol may afford a synergism to mitigate solute precipitation at below standard temperature conditions, where the solute is octadeoanol and the solvent system initially is isoprodanol-water azeotrope and then-butanol-water azeotrope is 52% water. No data appears to exist for possible azeotropes containing the three solvent components nor yet a four component one including the octadecanol.

Accordingly, two modifications were tested; one adding 5% n-butanol, by weight of a pre-made liquid evaporation retardant product containing 2.5% octadecanol in isopropanol-water azeotrope, and another adding 10% n-butanol. Using the icewater test referred to above, it was discovered that the 5% addition did not prevent solute precipitation at the 0° C. temperature sustained for several hours, but that the 10% addition did. The water concentration and octadecanol concentration need not be reduced below what is judicious in accordance with interpreting the results of the first experiment, or below what procures the fast dissolution as shown in the second experiment, departing from the recommendations just to meet a low temperature problem. To the contrary, if the problem is foreseen in certain circumstances, one can merely use n-butanol as a fourth constituent in the liquid evaporation retardant product made according to the process of the presently disclosed invention.

The invention will become even better understood from a detailed description to follow, which makes reference at times to the two figures of drawing next briefly described.

BRIEF DESCRIPTION OF THE FIGURES OF DRAWING

Figure 2:
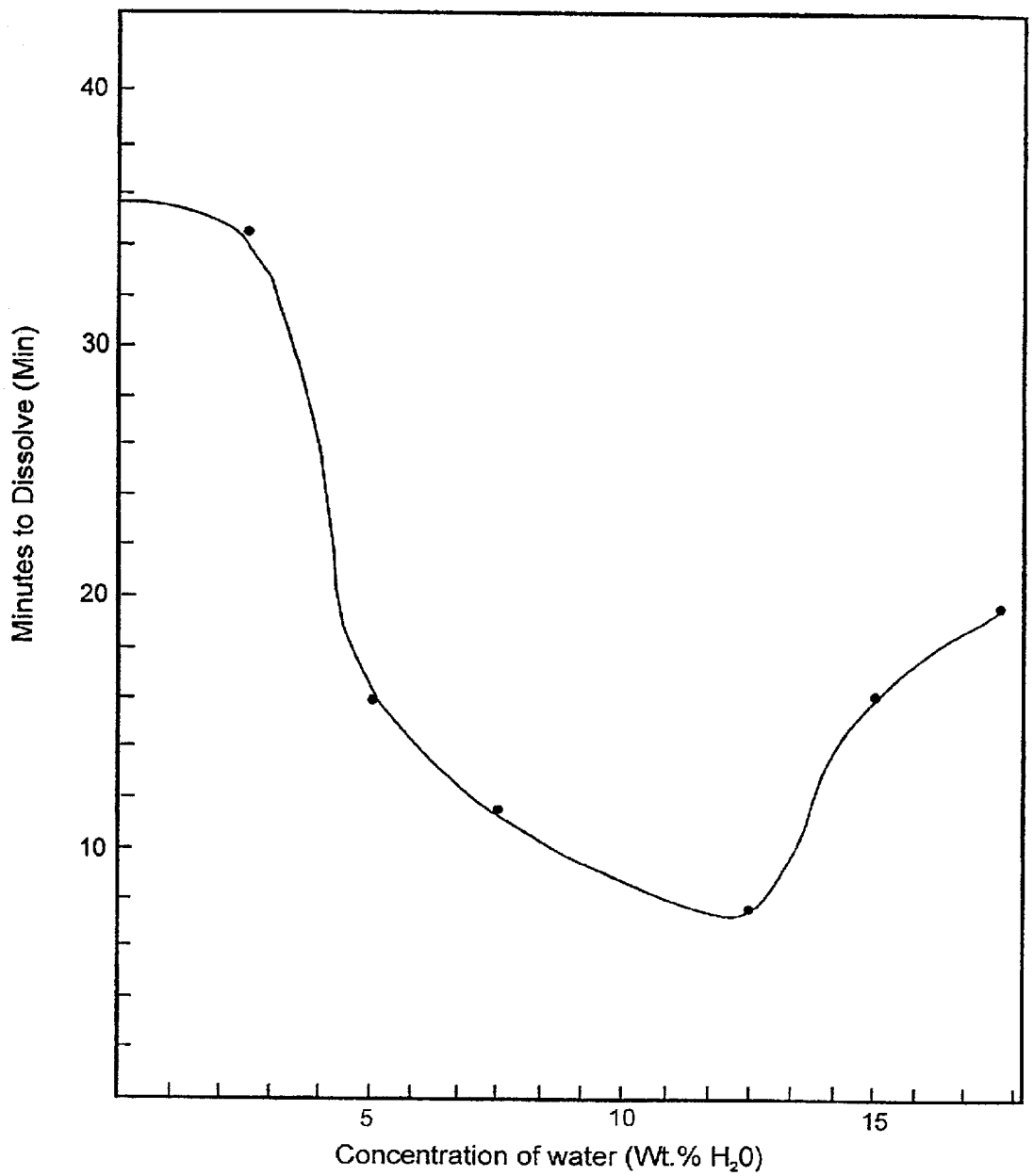

FIG. 1 graphs experimental data from Table I, and
FIG. 2 graphs experimental data from Table II.

DETAILED DESCRIPTION OF THE INVENTION

With reference to FIG. 1, the figure shows by inspection the originally hypothesized and subsequently experimentally verified decreasing function relation that obtains between water concentration as an independent variable and octadecanol concentration as a dependent variable, for solutions that consist of octadecanol, water, and isopropanol within the ranges shown. The decreasing linear function manifests as a sloped straight line descending to the right in Quadrant I of a Cartesian coordinates type graph. The slope of the line smoothly drawn through the scatter of experimental data turned out to be −0.33.

The y axis is intercepted at the high end of the line at a numerical value (in % by wt.) of 9.7 for solute octadecanol dissolved in undiluted isopropanol. The interception is about 0.5% higher than actually tested sample #1 of Table I.

Applying usual analysis to derive an equation for the sloped line, the inventor chose the slope-intercept form as the most useful. Stated without reference to substances involved or sign of the slope of the line, the equation is: y=mx+b, where 'b' is the number at which the y axis is intercepted, 'n' is the slope of the line, 'x' is the concentration for water, and 'y' is the concentration for octadecanol. The line falls to the right, as indicating a decreasing function, so the 'mx+b' becomes 'b−mx'. Inserting the slope value and y-axis intercept value, the equation reads: y=9.7−0.33x. Finally, italic uppercase 'C s' to mean concentrations, for y and x, may be subscripted with the chemical abbreviations, producing the equation:

$$C_{C_{18}OH}=9.7-0.33C_{H_2O}$$

which is hereby recommended to makers of evaporation retardant solutions of the type of the product of the process of the invention, because it is a highly convenient tool with which to check suitability of proportions of solution constituents used.

Proportions calculating at or above the line are not suitable because they risk precipitate formation at too high a degree of probability, by being so close to saturation level.

Constituent proportions selection to carry out the invention should always calculate out somewhat below the line, not quite satisfying the equation, in order to assure low likelihood of precipitate formation at standard conditions. Although a proportioning step required for conducting the full process of the invention, this step is not sufficient by itself and requires to be combined with at least one other, which is next discussed.

With reference next to FIG. 2, it is borne in mind that speed of dissolution would be especially important when large quantities of evaporation retardant product must be manufactured to fight drought causing large amounts of water loss by evaporation every hour, from large reservoirs. At the bottom of the generally 'U'-shaped curve, and as already discussed in the foregoing BRIEF SUMMARY section, evidence of a particularly fast dissolution action property of the azeotrope of isopropanol and water is apparent. Accordingly, the constituents selection step limitation that goes beyond suggesting that water may be included is to suggest that its inclusion should be procured by utilizing isopropanol-water azeotrope as the solvent system for making the solution in the manner carrying out the process of the invention.

Referring back now to the equation that was derived by analysis of the graphed data of FIG. 1, it is found that when applied to the azeotrope containing 12.6 wt % water, a saturation level for solute octadecanol is calculable as likely to occur at a concentration of about 5.54% by weight. Since, as already mentioned, a margin of safety from undue risk of Considering that droughts are so often associated with heat waves, the attention the inventor has given to low temperature storage and transport problems warrants some explanation. The problem arises because manufacturing facilities are not expected to be always located near the sites needing application of the solution made according to the process or the invention. The solution may be made at a site which is cold by comparison to where it will ultimately be used. Further, during long-range transport it may have to pass through cold regions, including climbs to high altitudes where it tends to be cold even at low latitudes. The icewater test described above was of course not A directed to mimicking conditions actually expected to be encountered, but instead was of the nature of an investigation into what might be done just in case cooler conditions of storage and transport were sometimes to be encountered.

The background contribution of prior art expressing concern with instability of solutions at widely varied temperatures is thought to have been dealt with quite satisfactorily by the inventor's discovery that a 10% addition of n-butanol to the usually adequate solution of the invention will confer superior cold temperature stability.

It is thought that by this point of disclosure the workers of ordinary skill in the art will have received enabling instruction with particular regard to identity and concentrations of constituents proposed by the inventor for inclusion in a liquid evaporation retardant product. There is little justification in the present inventor's opinion to doubt that it will not be as necessary to provide details with respect to how to mix and blend the constituents, since this is well within their existing skills and does not require the kind of extensive experimentation that was necessary to arrive at concentration specifications. In the BRIEF SUMMARY section above it has been indicated that the liquid constituents may be warmed, the solute may be finely divided, and agitation may be incorporated, to round out execution of the process in an effective manner. Solute precipitation at normal conditions is desired, it is a further limitation of the invention that, with respect to selecting constituents for blending per the process, no more than 5% by weight of octadecanol shall be employed.

Recalling here the dominating detrimental aspect of wind as it affects attempts to conserve water by applying film forming higher aliphatic alcohols to surfaces of large outdoor reservoirs, and recalling also the common practice of using an amount of film former in substantial excess of the theoretical amounts for given coverages, the inventor states preference for containing more nearly to or at the 5% concentration of octadecanol specifically when the solution containing it is intended for application to large outdoor reservoirs. Applications not involving the major detrimental effect of wind, such as use on indoor swimming pool surfaces, are effective at lower octadecanol concentration, taking 2.5% as representative, not a limit.

The reader and interested workers in the art will by now likely perceive both that and how the invention meets the above itemized technical objectives 1. through 4. Water in the solution makes it cheaper, and right amount makes it faster to produce. If cold temperatures are expected, a suitable additive has been indicated. What remains therefore is to report with respect to objective 5. that all solutions made according to the invention have proved in carefully conducted discharge ability testing to readily discharge through small orifices in submerged dispensers, down to at least an orifice diameter of 0.2 mm, without requirement of high pressure to force discharge.

To sum-up disclosure of the present invention, it is here stated to essentially be the process of mixing the azeotrope of isopropanol and water with up to 5% octadecanol by weight of the total solution, in order to dissolve the normally solid-phase octadecanol and thereby produce a liquid evaporation retardant solution, which, if desired can easily be rendered more storable and transportable than usual at low temperatures merely by adding n-butanol at 10% by weight of the pre-made solution.

Hopefully, not only will the spirit and essentials of the invention which above been conveyed prove of great benefit to humanity by providing better armament for fighting drought, but it is hoped that much of the new experimental data which has been presented, together with the new equation accompanying the first set of data, will find uses and inspire beneficial work in the art, advancing in the future even beyond the scope of the present invention as rather narrowly and uncovetously defined in the following appended claims.

What is claimed is:

1. In a process for manufacture of a liquid evaporation retardant solution wherein a normally solid-phase higher aliphatic alcohol is dissolved using a normally liquid-phase short-chain alcohol, the improvement comprising:

selecting octadecanol to constitute said higher aliphatic alcohol;

selecting isopropanol to constitute said short-chain alcohol;

selecting water as a solution constituent additional to said octadecanol and isopropanol constituents;

providing said isopropanol and said water in a proportion respecting one another that is known to be the proportion of an azeotrope of isopropanol and water;

proportioning, for inclusion in said evaporation retardant solution, said azeotrope in a concentration by weight for said solution of 95% and up, and said octadecanol in a concentration by weight of up to 5%; and, by any suitable means, so mixing together said octadecanol isopropanol, and water constituents, according to said provision for proportioning water and isopropanol respecting one another, and according to said proportioning of said azeotrope and said octadecanol, that said octadecanol dissolves and a liquid evaporation retardant product is manufactured.

2. The product of the process of claim 1, to which n-butanol at a concentration of 10% by weight of said product is added to afford a measure of capability to remain free for several hours of precipitated solute within a container subjected to below normal temperatures not lower than 0° C.

3. The product of claim 2 in which hexadecanol or a mixture containing mainly hexadecanol and octadecanol with minor amounts of $C_{14}$ to $C_{22}$ is substituted for octadecanol.

* * * * *